United States Patent [19]
Herman

[11] 3,828,460
[45] Aug. 13, 1974

[54] RODENT TRAP

[76] Inventor: Fritz Herman, 2848 N.E. 26 Court, Fort Lauderdale, Fla. 33306

[22] Filed: Mar. 7, 1973

[21] Appl. No.: 338,828

[52] U.S. Cl. .................................. 43/61, 43/67
[51] Int. Cl. ........................................... A01m 23/08
[58] Field of Search ............... 48/61, 67, 69; 220/74

[56] References Cited
UNITED STATES PATENTS

| | | | |
|---|---|---|---|
| 1,541,639 | 6/1925 | Gregory | 43/67 |
| 2,225,251 | 12/1940 | Andrick | 43/61 |
| 2,329,375 | 9/1943 | Houlihan | 220/74 X |
| 2,394,019 | 2/1946 | Socke | 220/74 UX |
| 2,774,175 | 12/1956 | Maddocks | 43/61 |
| 3,435,979 | 4/1969 | Grelle | 220/74 X |

Primary Examiner—Antonio F. Guida
Assistant Examiner—Daniel J. Leach

[57] ABSTRACT

An animal trap for rodents, comprising a sheet metal housing containing an elongated compartment, and a trap walk pivotally mounted in the compartment. The compartment is open at one end to allow entry of the animal, and closed at its other end by a slidable door. Bait is placed in the end of the compartment nearest the door. The trap walk is gravity balanced, so that, in its open position, its end nearest the entrance engages the bottom wall of the compartment and its other end engages the top wall of the compartment. The trap walk can be tilted to a closed position wherein said end nearest the entrance engages the top wall of the compartment and its other end engages the bottom wall of the compartment. A swing-type lock is mounted on the lower side of the trap walk and includes a prop that automatically swings by gravity to an upright position as an animal, attracted by the bait, moves up the trap walk and causes the same to tilt to its closed position, thereby entrapping the animal.

5 Claims, 7 Drawing Figures

PATENTED AUG 13 1974 3,828,460
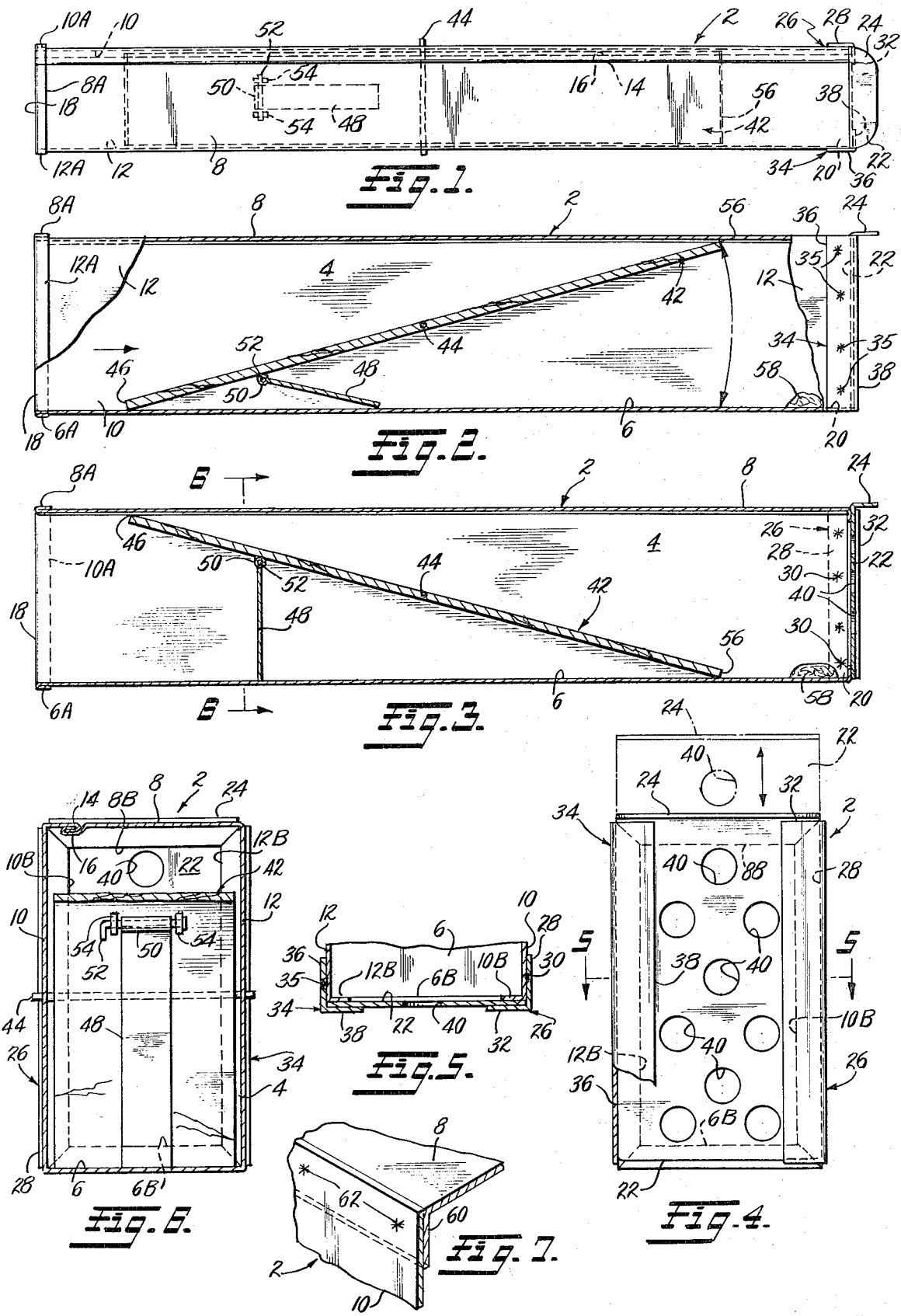

RODENT TRAP

BACKGROUND OF THE INVENTION

1. Field of the Invention

The invention relates to rodent traps and more particularly to a trap for rats, mice, squirrels, etc.

2. Description of the Prior Art

Various types of traps for catching rodents are well known, but many of these include spring-operated devices that kill or maim the animal. Numerous other types of traps for catching rodents "alive" are also known, a typical trap being shown in the patent to Gregory, U.S. Pat. No. 1,541,639. However, many traps of this type are fabricated from wire mesh, and flat and angle-shaped metal strips, and are expensive and take a lot of time to make. Also, many have the further disadvantage that they lack means for readily releasing the animal, particularly if it is alive and is to be transferred to another trap or released at a point remote from its site of capture. Still others are constructed so that, if the animal in the trap is dead, it is difficult to remove.

SUMMARY OF THE INVENTION

The present trap overcomes the foregoing objections by providing an extremely simple trap design enabling ready fabrication from sheet metal and wood at a minimum of cost. The housing of the trap is formed by cutting a piece of sheet metal to the desired configuration and then bending it to form an elongated compartment of rectangular cross-section. One end of the compartment is left open for animal entry, and the other end is closed by a sliding door having vent holes therein. A ramp, or trap walk, is pivotally mounted in the compartment and is adapted to be tilted to a closed position by the weight of the animal when it reaches a point beyond the balance point of the walk. A swing-lock at the underside of the trap walk has a gravity-operated prop that automatically swings to a vertical position to lock the trap walk in its tilted position. The entrapped animal can then be readily removed or released simply by raising the sliding door.

Many users of rodent traps have no hesitance with respect to permanently disposing of rats and mice, but feel differently about squirrels, although squirrels can be as destructive and as much of a nuisance as rats and mice. Hence, some individuals would prefer to trap a squirrel alive, and then transport it to a distant site and release it, or transfer it to a larger trap for later disposition. Accordingly, the present trap may be baited with either non-toxic or poisonous bait. Either type of bait can be readily positioned in the trap when the door is raised.

Accordingly, the principal object of the invention is to provide a rodent trap that can be easily and inexpensively fabricated and assembled.

Another object is to provide a trap that has a minimum number of parts.

A further object is to provide a trap wherein the animal can be "locked in" and confined without injury.

A still further object is to provide a trap that is easy to bait, and provides for quick release and/or removal of the animal.

Other objects and advantages of the invention will be apparent from the following description taken in conjunction with the accompanying drawings.

DESCRIPTION OF THE DRAWINGS

FIG. 1 is a plan view of the trap.

FIG. 2 is a front elevational view, partly in cross-section, with a portion of the near side wall of the housing broken away to better illustrate the details of the trap walk and the swinging lock, the trap walk being shown in its open position.

FIG. 3 is a longitudinal vertical sectional view through the trap, showing the trap walk locked in its closed position.

FIG. 4 is an enlarged elevational view of the right end of the trap, and particularly illustrating the details of the sliding door and its mounting means.

FIG. 5 is a fragmentary horizontal sectional view, taken on the line 5—5 of FIG. 4 showing the details of the mounting means or tracks for the sliding door.

FIG. 6 is an enlarged transverse vertical sectional view, taken on the line 6—6 of FIG. 3, particularly showing the swinging lock and the interlocking joint at the longitudinal edges of the housing.

FIG. 7 is an enlarged fragmentary sectional view showing a modified housing design in which the longitudinal edges of the housing are spot-welded together.

DESCRIPTION OF THE PREFERRED EMBODIMENTS

Referring now to the drawings, the trap comprises a housing 2 made from sheet metal, bent so as to form an elongated compartment 4 that is generally rectangular in transverse cross-section, as shown in FIG. 6. The compartment 4 is formed by a bottom wall 6, a top wall 8, and opposed side walls 10 and 12. The top wall 8 has crimped flange formations 14 and 16 along its longitudinal edges that cooperate to form an interlocked joint to maintain the housing 2 assembled.

The compartment 4 has an entrance end 18, the end edges of the bottom wall 6, top wall 8 and side walls 10 and 12 at said entrance being bent back upon themselves, as indicated at 6A, 8A, 10A and 12A, to stiffen the walls and to avoid sharp edges. The compartment 4 has an exit end 20, and the end edges of the bottom wall 6, top wall 8 and side walls 10 and 12 at said exit end are bent inwardly at right angles to their associated walls, and mitered to form flanges 6B, 8B, 10B and 12B, as is best shown in FIGS. 4 and 5. The outer face of the flanges 6B, 8B, 10B and 12B form a substantially continuous rectangular marginal surface that is engaged by the inner side of a sliding animal-release door 22. The upper end of the door 22 is bent horizontally to provide a ledge 24 that can be grasped for raising and lowering the door.

The door 22 is held in place along one vertical edge by an angle-shaped member 26 having a leg 28 that is spot-welded to the housing side wall 10, as indicated at 30, FIG. 3, and a leg 32 that confronts and partially overlies the outer side of the door 22. A similar angle member 34 has a leg 36 spot-welded at 35 to the side wall 12, and a leg 38 that confronts and partially overlies the door 22, at its other vertical edge. The angle members 26 and 34 extend for the full height of the side walls. Thus, the leg 32 cooperates with the flange 10B to provide a track for one edge of the door 22, and the leg 38 cooperates with the flange 12B to provide a track for the other edge of the door, as is best shown in FIG. 5. The door 22 has a plurality of vent openings 40 formed therein to allow air to enter the end of the compartment 4 in which an animal would normally be entrapped.

A generally oblong-shaped trap walk, or ramp, 42 is disposed in the compartment 4, and is slightly narrower in width than the compartment so that it can pivot freely on a pin 44 extending therethrough. The opposite ends of the pin 44 are mounted in holes in the side walls 10 and 12. The trap walk 42 can be made of wood, in which event the pin 44 can have a tight fit in the opening receiving the same, so that retaining means on the opposite ends of the pin is not required. If desired, the trap walk can be made of sheet metal and the pivot pin 44 suitably secured thereto.

A swing-lock is pivotally mounted on the underside of the trap walk 42 at a point slightly beyond midway between the pivot pin 44 and an extremity 46 of the trap walk 42. The lock comprises a narrow metal strip, or prop, 48 having a loop 50 at its upper end to receive a pivot pin 52. The pin 52 can be conveniently mounted in small screw eyes 54 threaded into the wooden trap walk 42. The pivot pin 44 for the trap walk 42 is so located that, in conjunction with the weight of the swing-lock components, the extremity 46 of the trap walk 42 will, by gravity, engage the bottom wall 6 of the compartment 4, as shown in FIG. 2, the opposite extremity 56 of said trap walk then engaging the top wall 8 of the compartment.

In using the present trap, the door 22 is raised and suitable bait 58 is positioned in the compartment 4, just inside the door. The bait 58 may be edible and nontoxic, or it may be poisonous, depending upon the intended use of the trap. The prop 48 of the lock is preferably swung inwardly so that the trap walk 42 assumes the "open" position shown in FIG. 2. As an animal enters the trap through the entrance 18 and walks up the trap walk 42, the trap walk will automatically tilt under the weight of the animal as it is overbalanced and the extremity 56 will swing downwardly until it engages the bottom wall 6 of the compartment 4 and the extremity 46 will engage the top wall 8. The trap walk 42 will be automatically retained in its tilted, or "closed," position by the swinging of the prop 48 to a vertical position, as shown in FIG. 3. The prop 48 serves as a rigid support and positively locks the trap walk 42 in the closed position shown, thereby entrapping the animal in the rear portion of the compartment 4. The animal may turn around and try to escape, but the prop 48 will prevent tilting of the trap walk 42 to its "open" position. If the bait 58 is poisoned, the animal may be allowed to remain in the trap until it dies. Otherwise, the animal may be released, removed if deceased, or transferred to another cage by raising the door 22. The trap can be readily reset by swinging the prop 48 inwardly and restoring the trap walk 42 to its original "open" position, as shown in FIG. 2. Fresh bait may be placed in the trap if needed, and the door 22 closed.

FIG. 7 illustrates a modified design for securing together the longitudinal edges of the metal sheet that is bent to form the housing 2. As is illustrated, the top wall 8 is formed with a depending flange 60 that is spotwelded at 62 at intervals, along the length of the flange, to the side wall 10. This provides an extremely simple and inexpensive way of making the housing 2.

It will be understood that various changes may be made in the arrangement and details of construction of the present trap, and that the trap may be made of any size desired, without departing from the principles of the invention or the scope of the annexed claims.

I claim:

1. A rodent trap, comprising: an elongated sheet metal housing containing a rectangular compartment formed by a bottom wall, a top wall and opposed side walls, said compartment being open at one end to provide an entrance; a slidable release door closing said compartment at its other, or exit, end; means providing inner and outer vertical guide tracks for the side edges of the slidable release door at said exit end of said compartment, mounting said slidable release door so that it can be withdrawn vertically; a generally oblong shaped trap walk in said compartment; pivot means located at about midway of the length of said trap walk, mounting said trap walk for tilting movement in said compartment, said trap walk having a normally upwardly inclined, or open, position wherein the end thereof nearest said entrance end of said compartment engages said bottom wall and its opposite end engages said top wall, and having a downwardly and rearwardly tilted, or closed, position wherein the end thereof nearest said exit end engages said bottom wall and its opposite end engages said top wall, and having a downwardly and rearwardly tilted, or closed, position wherein the end thereof nearest said exit end engages said bottom wall and its other end engages said top wall; and means automatically operable in response to tilting movement of said trap walk from its open to its closed position for locking said trap walk in its closed position.

2. A rodent trap as defined in claim 1, wherein the end of the bottom wall, the top wall and the side walls, respectively, is folded back flat upon itself at the entrance end of the compartment to stiffen said walls and to avoid sharp edges.

3. A rodent trap as defined in claim 1, wherein the means for automatically locking the trap walk in its closed position comprises a prop, and means spaced inwardly from the entrance end of the trap walk pivotally connecting one end of said prop to the underside of the trap walk, said prop normally assuming an inclined position beneath the trap walk when said trap walk is in its open position, but being free to swing by gravity to a vertical position upon tilting of said trap walk from its open to its closed position.

4. A rodent trap as defined in claim 1, wherein the ends of the bottom, top and side walls, respectively, at the exit end of the compartment are mitered and bent inwardly so that they are disposed at substantially right angles to their respective associated wall and form a substantially continuous rectangular marginal surface confronting the inner side of the slidable release door, the inwardly bent ends of said side walls forming the inner guide track for the slidable release door; and wherein a pair of angle-shaped members each having one leg attached to one of the side walls of the housing and its other leg engaged with the outer side of the slidable release door form the outer guide track for the slidable release door.

5. A rodent trap as defined in claim 3, wherein the means pivotally connecting the prop to the trap walk is located about midway between the entrance end of the trap walk and the pivot means of said trap walk.

* * * * *